United States Patent
Berks et al.

(10) Patent No.: US 7,080,206 B2
(45) Date of Patent: Jul. 18, 2006

(54) SYSTEM AND METHOD FOR ADAPTIVELY LOADING INPUT DATA INTO A MULTI-DIMENSIONAL CLUSTERING TABLE

(75) Inventors: Robert T. Berks, Auckland (NZ); Miroslaw A. Flasza, Pickering (CA); Leo Tat Man Lau, Richmond Hill (CA); Mark D. Leitch, Ajax (CA); Sam S. Lightstone, Toronto (CA); David Tremaine, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 10/425,351

(22) Filed: Apr. 29, 2003

(65) Prior Publication Data
US 2004/0123039 A1    Jun. 24, 2004

(30) Foreign Application Priority Data
Dec. 23, 2002    (CA) .................................... 2415018

(51) Int. Cl.
*G06F 12/00* (2006.01)
(52) U.S. Cl. ...................................... 711/133; 711/159
(58) Field of Classification Search ................ 711/113, 711/118–136, 159; 707/7; 370/386
See application file for complete search history.

(56) References Cited

U.S. PATENT DOCUMENTS

| | | | |
|---|---|---|---|
| 5,606,529 A * | 2/1997 | Honma et al. .......... 365/230.03 |
| 5,657,469 A * | 8/1997 | Shimizu ...................... 711/118 |
| 5,930,233 A | 7/1999 | Kanerva et al. ............ 370/231 |
| 6,195,659 B1 | 2/2001 | Hyatt ............................. 707/7 |
| 6,216,066 B1 | 4/2001 | Goebel et al. ................ 701/29 |
| 6,490,652 B1 * | 12/2002 | Van Hook et al. .......... 711/118 |
| 6,557,080 B1 * | 4/2003 | Burger et al. ............... 711/137 |
| 2002/0163909 A1 * | 11/2002 | Sarkinen et al. ............ 370/386 |

* cited by examiner

*Primary Examiner*—Nasser Moazzami
(74) *Attorney, Agent, or Firm*—Samuel A. Kassatly

(57) ABSTRACT

A system and associated method load an input data stream into a multi-dimensional clustering (MDC) table or other structure containing data clustered along one or more dimensions, by assembling blocks of data in a partial block cache in which each partial block is associated with a distinct logical cell. A minimum threshold number of partial blocks may be maintained. Partial blocks may be spilled from the partial block cache to make room for new logical cells. Last partial pages of spilled partial blocks may be stored in a partial page cache to limit I/O if the cell associated with a spilled block is encountered later in the input data stream. Buffers may be reassigned from the partial block cache to the partial page cache if the latter is filled. Parallelism may be employed for efficiency during sorting of input data subsets and during storage of blocks to secondary storage.

46 Claims, 8 Drawing Sheets

SYSTEM AND METHOD FOR ADAPTIVELY LOADING INPUT DATA INTO A MULTI-DIMENSIONAL CLUSTERING TABLE

PRIORITY CLAIM

The present application claims the priority of Canadian Patent Application 2,415,018, titled "Adaptive Parallel Data Clustering When Loading A Data Structure Containing Data Clustered Along One Or More Dimensions," filed on Dec. 23, 2002, which is incorporated herein by reference in its entirety.

FIELD OF THE INVENTION

The present invention relates to the field of database systems, and more particularly to a system and associated method for adaptively clustering parallel data when loading a data structure containing data that is clustered along one or more dimensions, such as a multi-dimensional clustering (MDC) table.

BACKGROUND OF THE INVENTION

In database terminology, a multi-dimensional clustering (MDC) table is a table in which data is logically clustered (and sometimes also physically clustered) on disk according to a specified key referred to as the "dimension key." Each distinct value in the domain of key values represents a "cell" of the MDC table. On disk, each cell comprises one or more fixed size "blocks," where each block may only contain data for one cell. It is not necessary for all blocks associated with a cell to be contiguously stored on disk.

For example, consider an MDC table SALES having the following definition:
SALES (INT STORE_ID, INT CUST_ID, DATE SALE_DATE, INT SALE_MONTH GENERATED ALWAYS AS MONTH(D))
DIMENSIONS(STORE_ID, SALE_MONTH)

The DIMENSIONS clause of the SALES table defines the dimension key that indicates how the data is to be clustered on disk. In this example, data for the SALES table is to be clustered by STORE_ID and SALE_MONTH. The physical blocks on disk for this table may appear as follows:
block1 (contains data for cell (1, 1), i.e., STORE_ID "1" and month "1"):
1, 20, 2002/01/01, 1
1, 21, 2002/01/03, 1
1, 21, 2002/01/04, 1
1, 22, 2002/01/05, 1
:
block2 (contains data for cell (2, 1), i.e., STORE_ID "2" and month "1"):
2, 43, 2002/01/01, 1
2, 10, 2002/01/02, 1
2, 52, 2002/01/15, 1
:
block3 (contains more data for cell (1, 1), i.e., STORE_ID "1" and month "1"):
1, 25, 2002/01/15, 1
1, 31, 2002/01/15, 1
1, 32, 2002/01/15, 1
1, 45, 2002/01/16, 1
1, 12, 2002/01/16, 1
:

Each comma-delimited line above denotes a single row, groups of which may form fixed-size pages (e.g., sub-blocks or other sub-divisions) within fixed-size blocks.

A challenge that arises when large quantities of data are bulk-loaded into an MDC table is ensuring favorable input/output characteristics (i.e. minimizing read/write operations to disk as much as possible) in the face of an unknown distribution of input data. The term "unknown distribution" as used herein refers to the absence of any prior knowledge by the input data loading algorithm of the degree to which the input data is already clustered with respect to an operative dimension key.

At least two approaches to loading data into an MDC table are known. These are referred to as "Algorithm 1" and "Algorithm 1_".

The steps of Algorithm 1 may be summarized as follows:
1. Read all input data rows (i.e. records) from disk. As each row is read, perform an in-memory "bucket sort" of the row according to its dimension key. Whenever a block is filled, write it to disk.
2. When all rows have been processed, write to disk any partially filled blocks that are still in memory.

Algorithm 1 exhibits optimum input/output (I/O) characteristics regardless of input data distribution because no blocks are written to disk prematurely during loading, thus no blocks need to be read back from and re-written to disk in order to be updated. If input data is well clustered, the amount of memory needed by Algorithm 1 will be minimal, since blocks in memory will be repeatedly filled and written to disk (thus vacating memory for re-use), with few incomplete blocks residing in memory at any given time during loading.

As input cell data becomes more and more randomly distributed throughout the input data, however, Algorithm 1 requires more and more memory to maintain its optimum IO characteristics. In the worst case, if N cells are represented in the input data, N * blocks of memory are required. If N is large, the amount of memory required may be infeasible for practical implementation.

Algorithm 1_modifies the approach of Algorithm 1 slightly to accommodate a memory constraint. When a predetermined upper limit of memory is reached and space for a new block is needed, Algorithm 1_chooses a partially filled block in memory (perhaps based on age) and writes, or spills, the partially filled block to disk. An example of an arbitrary buffer replacement strategy is "last recently used" approach known in the art. In this approach, when data is perfectly clustered, only one block-size chunk of memory is required to store a block that is repeatedly filled and written to disk.

When data is well clustered but not perfectly clustered, the likelihood of further input data rows having the dimension key of a partially filled block that is spilled to disk is low, although not zero. It is therefore improbable that a partially filled block that has been spilled to disk will ever require updating in the future, and near-optimum I/O characteristics may be achieved.

An alternative approach to the two algorithms described above involves sorting all the input data according to the dimension key prior to loading. Sorting the data will result in the data being perfectly clustered according to the dimension key. When data is randomly distributed in the input file, sorting is likely (on average) to produce the best I/O characteristics possible.

However, there are at least two significant drawbacks to pre-sorting the data. First, when the input data is already well clustered, sorting may constitute a significant waste of processing. Second, sorting may not only cluster the data according to the dimension key but may also order all blocks according to the dimension key. Since blocks associated with a cell do not need to be stored contiguously on disk, such extra processing constitutes an unnecessary waste of resources.

Additionally, there are at least two more drawbacks when using sorting to cluster the data. In most cases, sorting requires additional I/O. Unless the entire input can be fit into main memory, there will be a need to spill partially sorted runs and read them back in during a merge phase (this is an additional performance penalty). In addition, the sorting approach doesn't parallelize easily. One has to wait for the sort to process the entire input before the actual loading process can start. Consequently, this limits the ability to pipeline the operations.

What is therefore needed is a method of loading data into multi-dimensional clusters that addresses at least some of the above noted disadvantages. The need for such a system has heretofore remained unsatisfied.

SUMMARY OF THE INVENTION

The present invention satisfies this need, and presents a system, a computer a program product, and an associated method (collectively referred to herein as "the system" or "the present system") for loading input data into a multi-dimensional clustering (MDC) table or other structure containing data clustered along one or more dimensions.

The present system assembles blocks of data in a partial block cache in which each partial block is associated with a distinct logical cell. A minimum threshold number of partial blocks may be maintained. Partial blocks may be spilled from the partial block cache to make room for new logical cells. Last partial pages of spilled partial blocks may be stored in a partial page cache to limit I/O if the cell associated with a spilled block is encountered later in the input data stream. Buffers may be reassigned from the partial block cache to the partial page cache if the latter is filled. Parallelism may be employed for efficiency during sorting of input data subsets and during storage of blocks to secondary storage.

In accordance with one aspect of the present system there is provided a method of loading input data into a data structure containing data that is clustered along one or more dimensions. This method comprises storing in a partial block cache partial blocks assembled from the input data, each of the partial blocks being associated with a distinct logical cell, and storing in a partial page cache last partial pages of partial blocks victimized from the partial block cache.

In accordance with another aspect of the present system, there may be provided a computer program product having media including computer programmed instructions for directing a computing device to implement the above method.

In accordance with another aspect of the present system, there may further be provided a computing device comprising a processor and persistent storage memory in communication with the processor storing processor readable instructions for directing the device to undertake the above method.

In accordance with another aspect of the present system, there may further be provided a data processing system for loading input data into a data structure containing data that is clustered along one or more dimensions. The data processing system comprises means for storing in a partial block cache partial blocks assembled from the input data, each of the partial block being associated with a distinct logical cell. In addition, the data processing system comprises means for storing in a partial page cache the last partial pages of partial blocks victimized from the partial block cache.

In accordance with another aspect of the present system, there may further be provided a computer program product having media including computer programmed instructions for implementing the data processing system previously described.

Other aspects and features of the present system will become apparent to those ordinarily skilled in the art upon review of the following description of specific embodiments of the system in conjunction with the accompanying figures.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
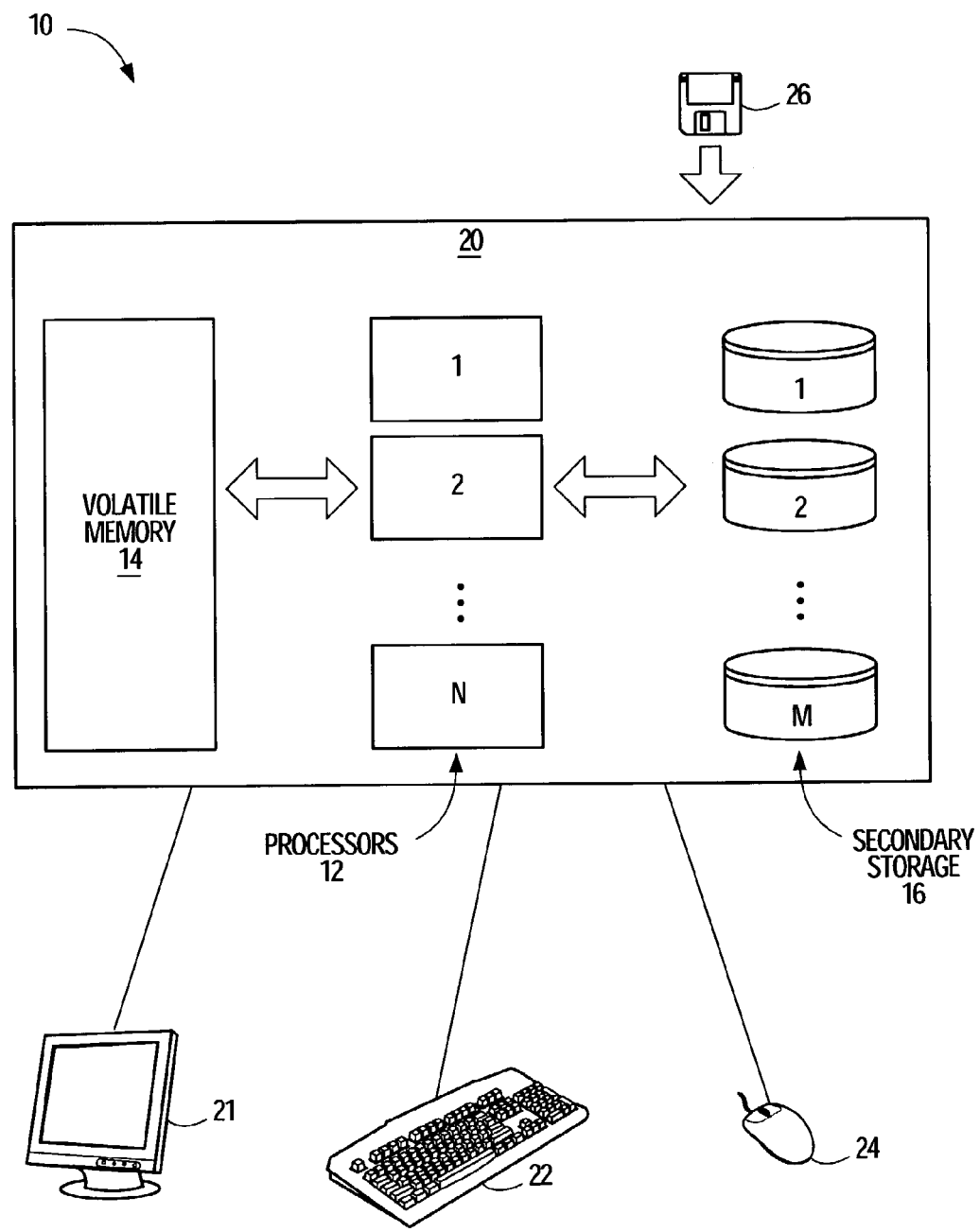
FIG. 1 is a schematic illustration of an exemplary operating environment in which an adaptive parallel data clustering system of the present invention can be used.

FIG. 1 portrays an exemplary overall environment in which a database system 10 and associated method for adaptive parallel data clustering when loading a data structure containing data clustered along one or more dimensions according to the present invention may be used. The database system 10 is a symmetric multi-processor (SMP) computing device 20 having N processors 12 (where N is an integer). Each of the N processors 12 is in communication with volatile memory 14 as well as non-volatile memory 16 (also referred to as "secondary storage" or "disks" 16), which in the present case comprises M hard disk drives (where M is also an integer).

As is typical, computing device 20 may include a display 21 and multiple input peripherals, such as a keyboard 22 and mouse 24, as well as hardware to network with other computers (not shown). The database system 10 may be loaded with instructions for executing methods exemplary of this invention from a computer program product 26 having a computer readable medium, which could be an optical or magnetic disk, tape, or chip for example. Alternatively, the instructions for executing methods exemplary of this invention can be saved on a suitable storage medium such as a diskette, a CD, a hard drive, or like devices.

Figure 2:
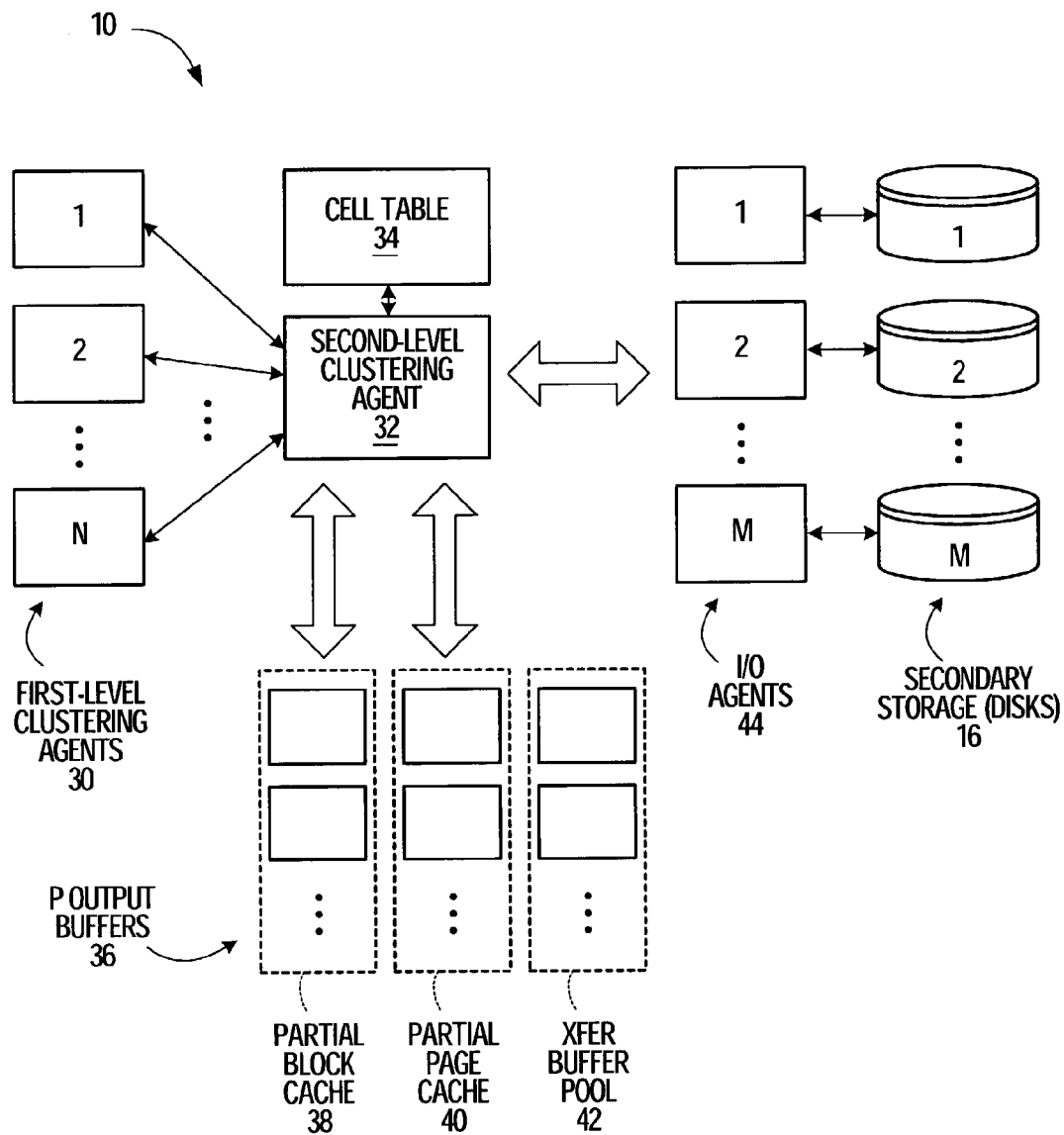
FIG. 2 is a schematic diagram illustrating components of the system of FIG. 1 in greater detail.

FIG. 2 is a schematic diagram illustrating software components, data structures and hardware components of the database system 10 in greater detail. The software components and data structures comprise the following components: N first-level clustering agents 30 (where N is the number of processors 12 in computing device 20); a single second-level clustering agent 32; a set of P output buffers 36 (where P is an integer) comprising a partial block cache 38, a partial page cache 40, and a transfer buffer pool 42; a cell table 34; and M input/output (I/O) agents 44 (where M is the number of hard disk drives).

The N first-level clustering agents 30 are processes that perform a first level of processing of input data to be loaded into an MDC table of the database system 10. Each of the N first-level clustering agents 30 processes a different subset of input data in parallel with the other N−1 agents.

The second-level clustering agent 32 is a process that performs a second level of input data processing using the output of the N first-level clustering agents 30.

The P output buffers 36 are areas of volatile memory that are used for the purpose of assembling blocks for storage to secondary storage 16. Each of the P output buffers 36 is capable of storing a single block of a multi-dimensionally clustering (MDC) table. The P output buffers 36 are apportioned between a partial block cache 38, a partial page cache 40 and a transfer buffer pool 42, with the apportionment capable of change during system operation as described below.

Partial block cache 38 stores partially filled blocks as they are assembled during processing of the input data stream, with completely assembled blocks being sent to secondary storage 16.

Partial page cache 40 stores the last partially filled page for partially filled blocks which are spilled to secondary storage 16 from the partial block cache 38 in order to make room for new blocks associated with new cells encountered in the input data stream. Each buffer in partial page cache 40 is capable of storing multiple "last partial pages", with each partial page corresponding to a different cell.

The transfer buffer pool 42 is a set of buffers used to transfer data from the second-level clustering agent 32 to the M I/O agents 44. The buffers of transfer buffer pool 42 circulate between the second-level clustering agent 32 and the M I/O agents 44 as they are filled with data by the second-level clustering agent 32, read by the I/O agents 44 for writing to secondary storage 16, and "returned" to the second-level clustering agent 32 for re-use (i.e. for refilling with new data). The blocks being written to secondary storage 16 using the transfer buffers of transfer buffer pool 42 may be fully assembled blocks that are being stored or partially assembled blocks that are being spilled.

The cell table 34 is a searchable and updateable table maintained by the second-level clustering agent 32 during its processing of input data. The cell table 34 is maintained in volatile memory 14, although portions of the table may be spilled if necessary to a secondary storage device such as secondary storage 16, e.g. to make room for new pages in memory. Cell table 34 includes information regarding MDC table cells that have been detected in the input data thus far. Cell table 34 stores the following information for each detected cell:

A pointer (or more generally, a reference) to the buffer in the partial block cache 38 corresponding to this cell (in cases when nothing exists in the partial block cache 38 for the cell, this pointer is NULL).

A pointer (or more generally, a reference) to the last partial page for the cell in the partial page cache 40 or NULL if there is no entry in the partial page cache 40 for the cell.

The number of the page (relative to the block) of the last partially filled page for the cell. For example, if a block can contain 32 pages, the last partially filled page for the block (before the block was victimized from the partial block cache 38) may have been page 12.

The position within the last partially filled page where data was last added. For example, if a page is 4K (i.e., 4096 bytes in size), the last row of data added to the page may end at byte 2033.

The ID of the I/O agent 44 to which the previous partially filled block for this cell was sent (this information being maintained so that CONTINUATION requests, i.e. requests to write to secondary storage 16 at a particular location, and MERGE requests, i.e. read requests for a partial block followed by a request to write the partial block with data appended thereto, may be sent to the same I/O agent 44).

Cell table 34 may be implemented as a temporary table with an index that is used for searching the table based on dimension key, for example.

The I/O agents 44 are processes that perform I/O to the M disks comprising secondary storage 16. Each I/O agent 44 is free to write to any of the M disks 16. The number of I/O agents 44 is configured to be M to exploit the disk parallelism that can be achieved with M disks.

In overview, a sliding window is defined over input data to be loaded into a MDC table. The window size is dependent upon the amount of available memory: the more memory that is available, the larger the window is and the greater the amount of data clustering that may be performed.

For a given window position, the input data within the window is divided evenly into portions among N first-level data clustering agents 30. The first-level data clustering agents 30 execute concurrently, with each agent clustering its data portion into a single list of rows having one or more "sub-lists". Each sub-list contains data belonging to a single cell.

When a first-level clustering agent 30 is finished clustering its portion of data from the current input window, it provides its list to the single second-level clustering agent 32. The second-level clustering agent 32 collects lists from each of the first-level clustering agents 30 and then, processing the lists sequentially, attempts to cluster the data in all of the N lists into blocks that can be written out to secondary storage 16. The second-level clustering agent 32 uses the output buffers 36 for this purpose, in the following manner.

Originally all P output buffers 36 are allocated as transfer buffers of transfer buffer pool 42, and the partial block cache 38 and partial page cache 40 are empty (i.e. have no buffers).

When a new cell is encountered in the input data stream, the second-level clustering agent 32 acquires a buffer from the transfer buffer pool 42 to begin assembling a first block for that cell. If there is enough input data to fully assemble one or more blocks, the blocks are spilled to secondary storage 16. If a partially filled block remains, the buffer is allocated to the partial block cache 38. Allocation of partial blocks to the partial block cache 38 may be repeated until a maximum number Y of buffers has been allocated to the partial block cache 38, where Y is an integer less than P. The value of Y is preferably chosen such that the transfer buffer pool 42 is left with at least one buffer per I/O agent 44 (i.e., leaving at least M output buffers 36) to promote I/O parallelism of the M I/O agents 44.

When the maximum number of buffers (Y) has already been allocated to the partial block cache 38, victimization of a partial block from the partial block cache 38 becomes necessary for storing a partial block associated with a new cell encountered in the input data stream. Consequently, the second-level clustering agent 32 victimizes a partial block from the partial block cache 38 and stores its last partially filled page in any available buffer of the partial page cache 40. It will be appreciated that the term 'buffer replacement' or the term 'partial block replacement' may be used instead of 'victimization.'

The last partial page is stored so that, if the input data stream contains further data belonging in the cell corresponding to the spilled partial block, data may continue to be filled in without first reading the entire spilled block back into memory from secondary storage 16. If the partial page cache 40 has insufficient space to store this page (e.g., when the partial page cache 40 has not yet been allocated any buffers), a further buffer is reassigned from the partial block cache 38 to the partial page cache 40. The partial block stored therein is then spilled to secondary storage 16. This reassigned buffer is used to store the last partial pages of the victimized buffers' blocks, with the remaining space of that reassigned block being left empty for future storage of partial pages of other blocks that may be spilled. The freed space of the partial block cache 38 is then used to store the new partial block.

Reassignment of buffers from the partial block cache 38 to the partial page cache 40 is permitted because storage of partial pages is important in limiting costly I/O operations associated with the reading back of partial blocks previously spilled to secondary storage 16.

When spilling a partially filled block or storing a fully assembled block to secondary storage 16, the second-level clustering agent 32 assigns the block to the transfer buffer pool 42 and marks it as being in need of writing to secondary storage 16 by one of the group of M asynchronous I/O agents 44. For efficiency, each of the I/O agents 44 preferably writes to its dedicated disk in parallel with the other I/O agents 44.

Upon the filling of an output buffer in the partial page cache 40 with last partial pages of spilled blocks, a further buffer may be reassigned from the partial block cache 38 to the partial page cache 40 for storing additional partial pages. However, the number of buffers in the partial block cache 38 is not permitted to fall below a threshold number T (where T is an integer less than or equal to Y). The purpose of maintaining a minimum threshold number of buffers in the partial block cache 38 is to facilitate the assembly of at least T blocks (of T different cells) at any given time. This may be especially important when the input data is not well clustered, to avoid the need to frequently swap partial blocks out of and back into the partial block cache 38.

If the number of blocks in the partial block cache 38 drops to the threshold number T, the number of buffers in the partial block cache 38, partial page cache 40, and transfer buffer pool 42 may then remain fixed at T, Y-T and P-Y buffers respectively for the duration of processing (this being referred to as the "steady-state condition").

Figure 3A:
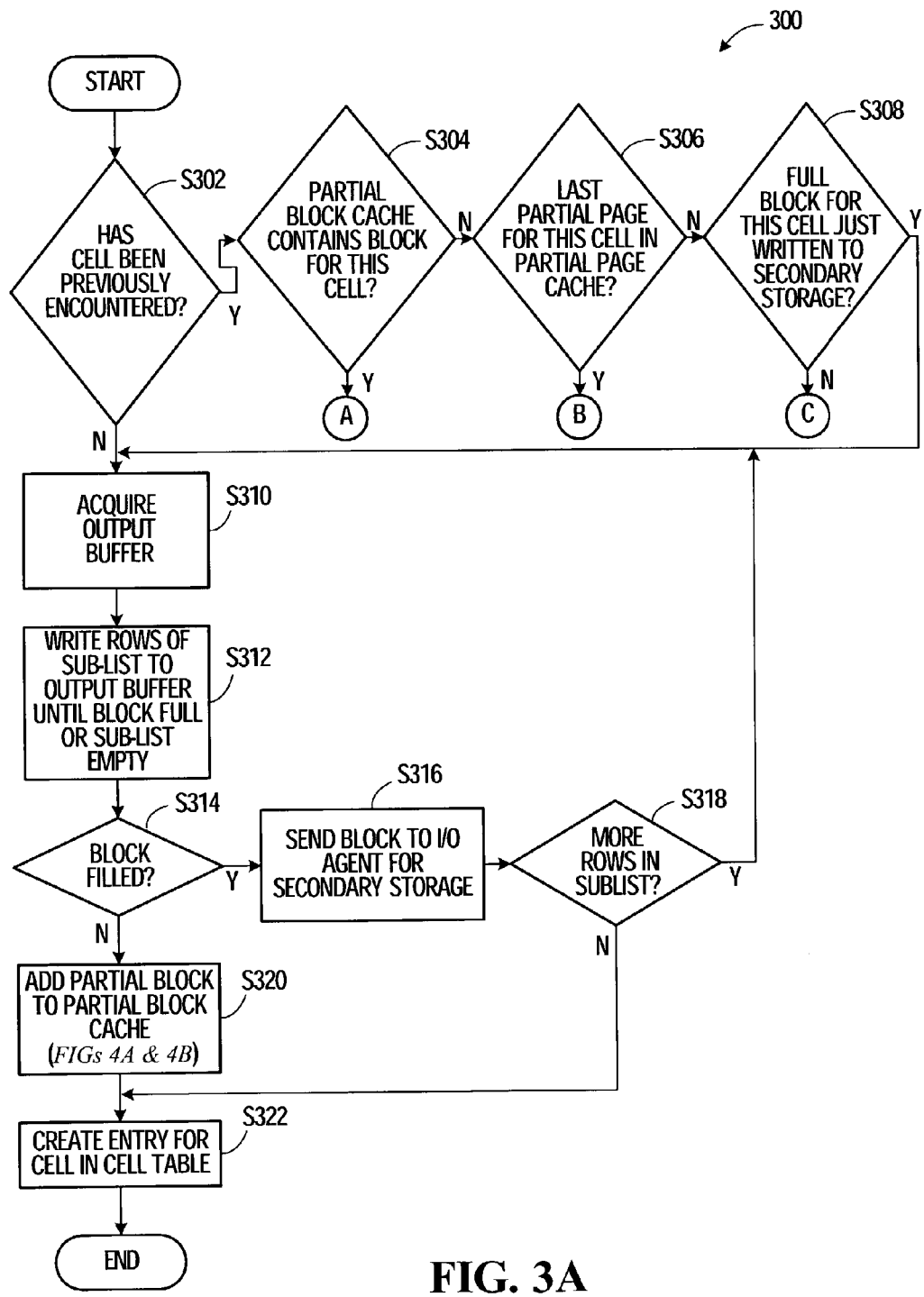
FIG. 3 is comprised of FIGS. 3A, 3B, 3C, and 3D, and illustrates the operation performed by the second-level clustering agent of FIG. 2 for processing a sub-list of input data.
Figure 3B:
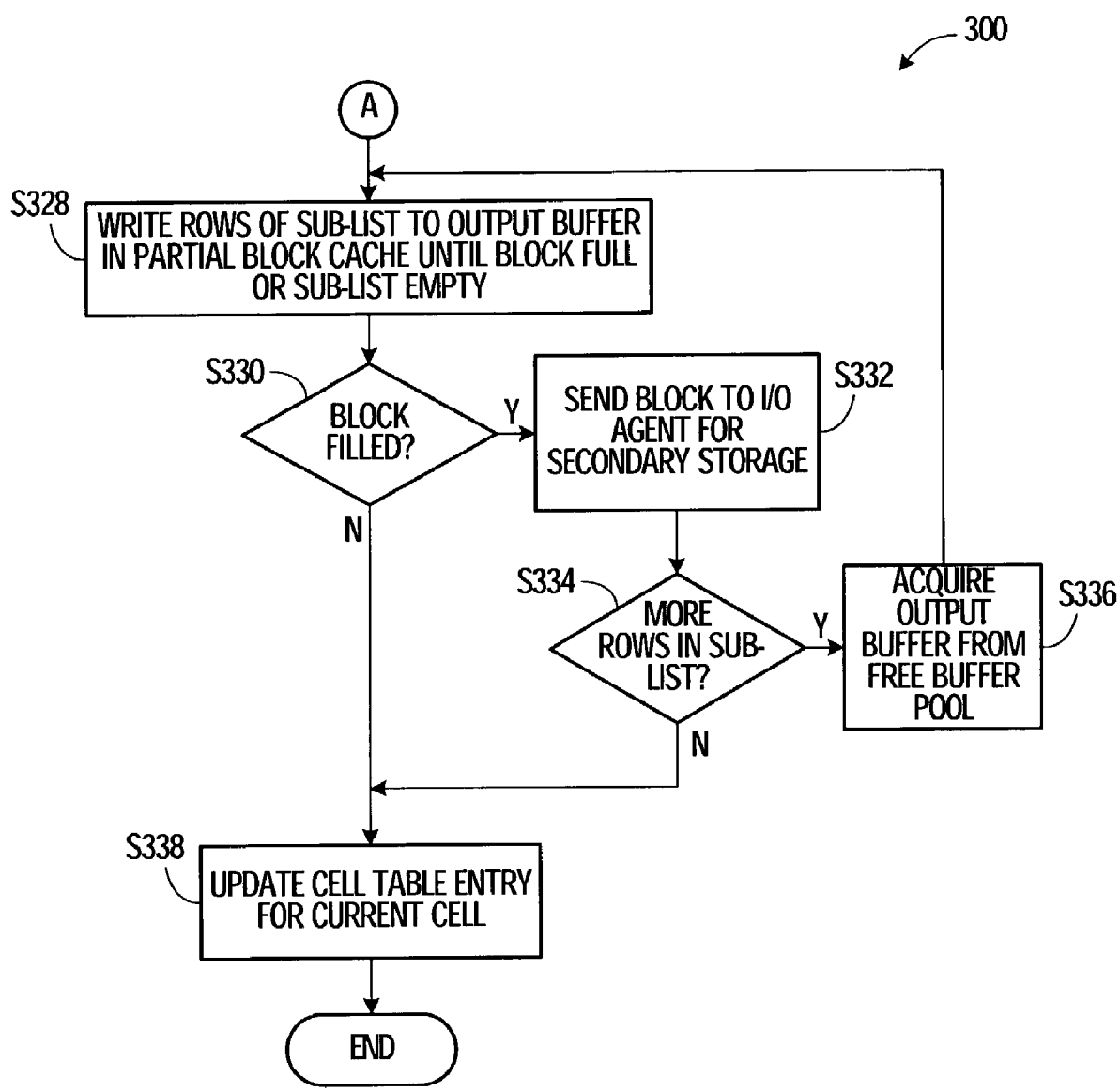
Figure 3C:
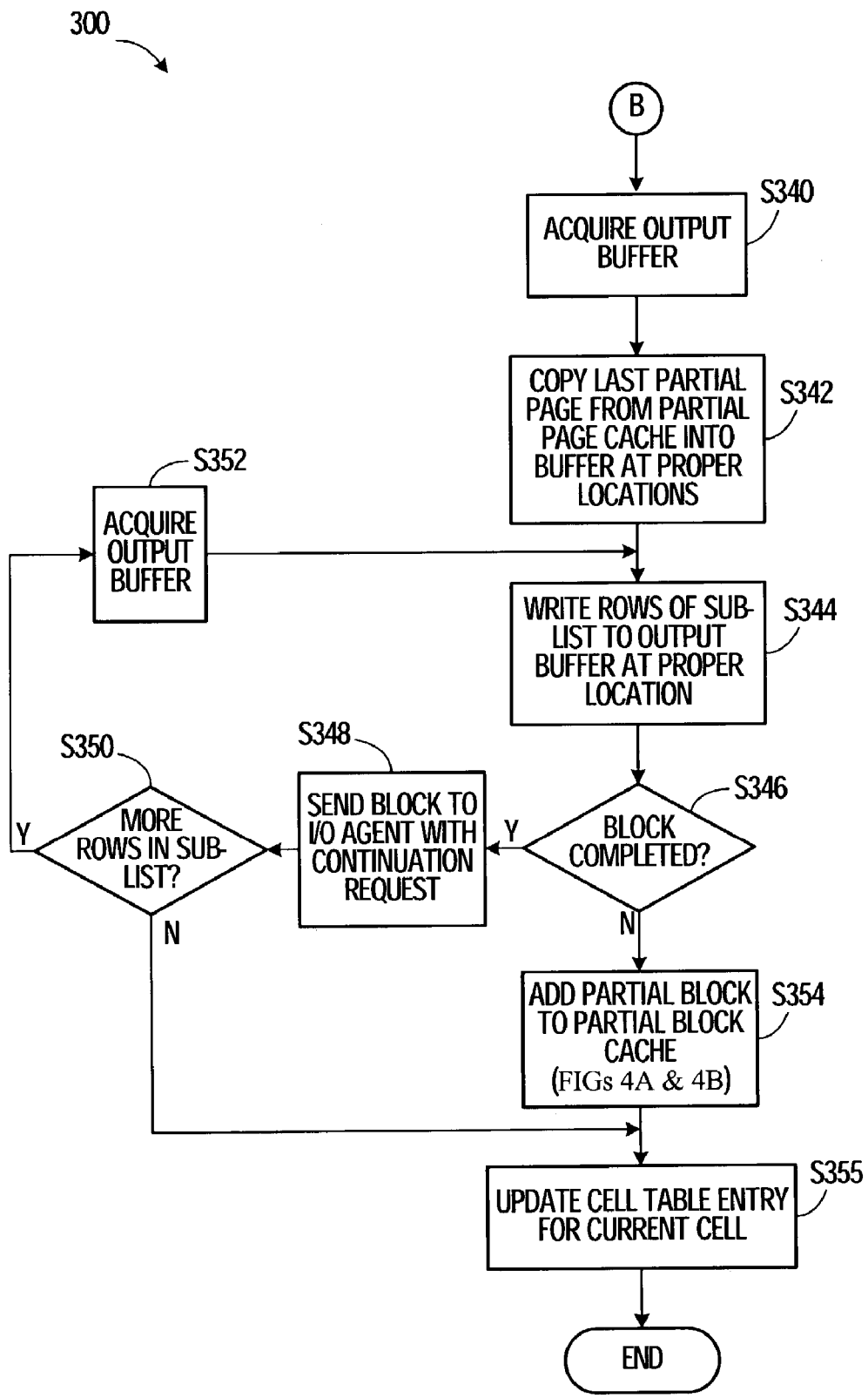
Figure 3D:
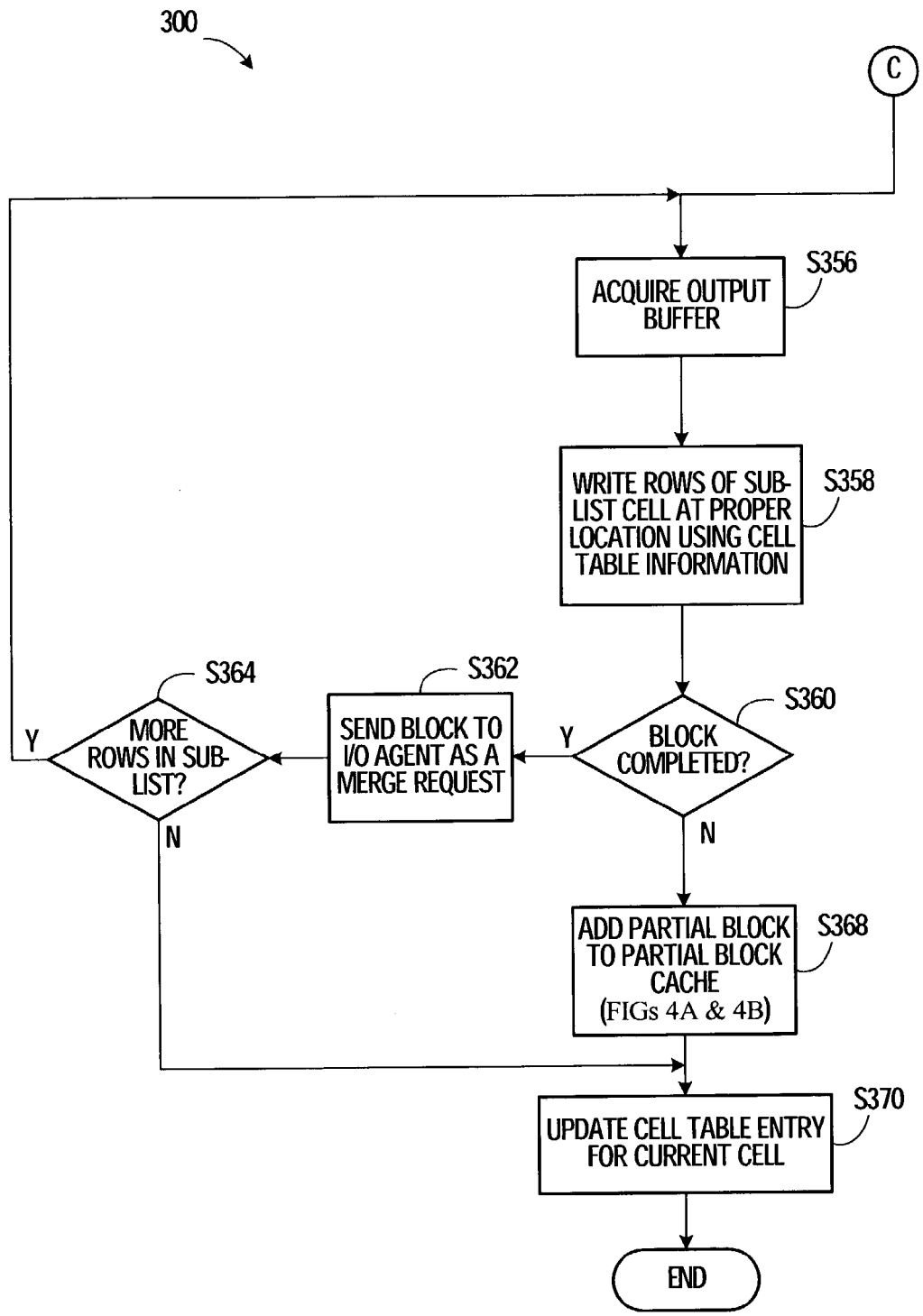
Figure 4A:
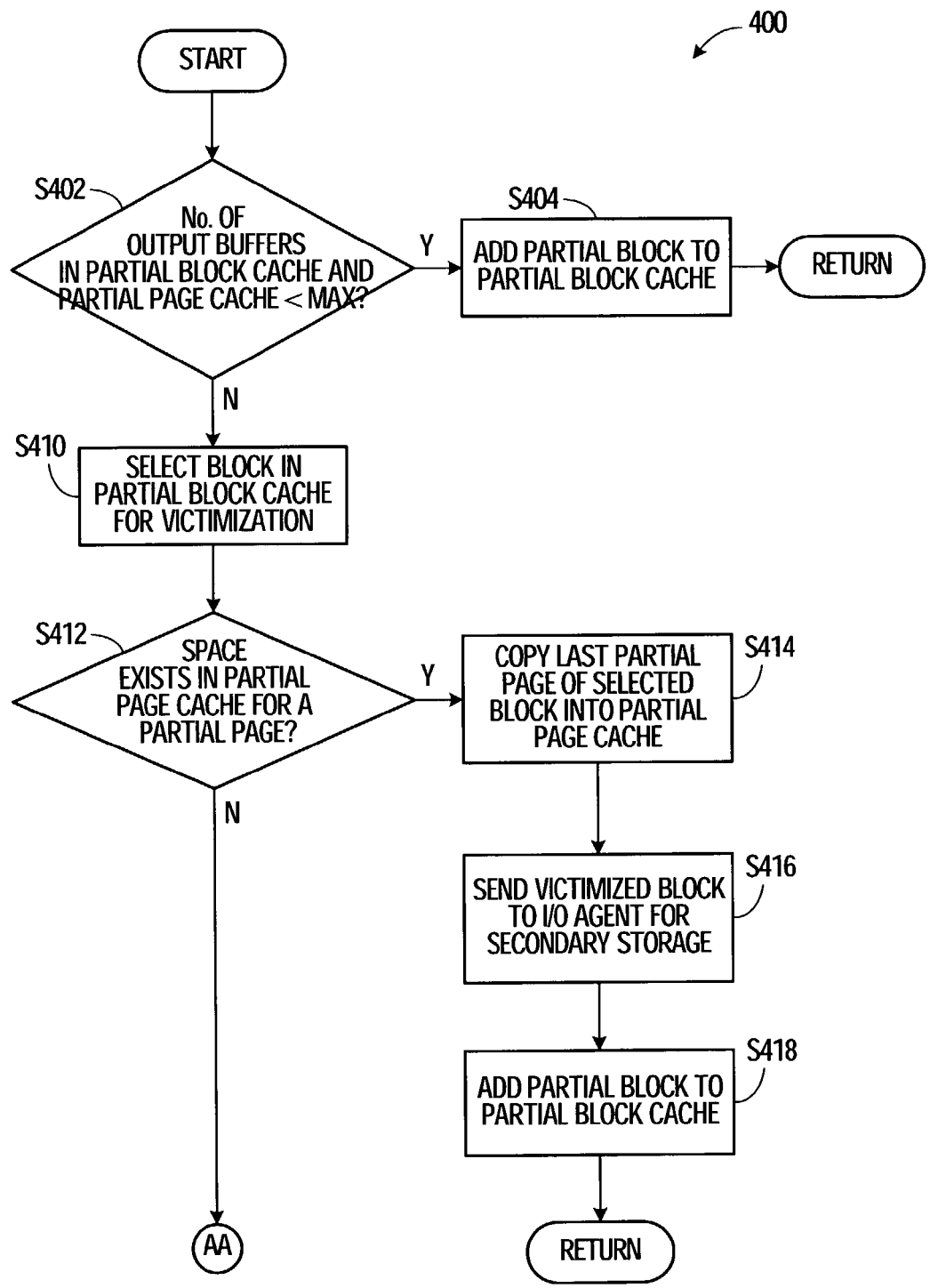
FIG. 4 is comprised of FIGS. 4A and 4B, and illustrates the operation performed by the second-level clustering agent of FIG. 2 for writing a partial block to a partial block cache.
Figure 4B:
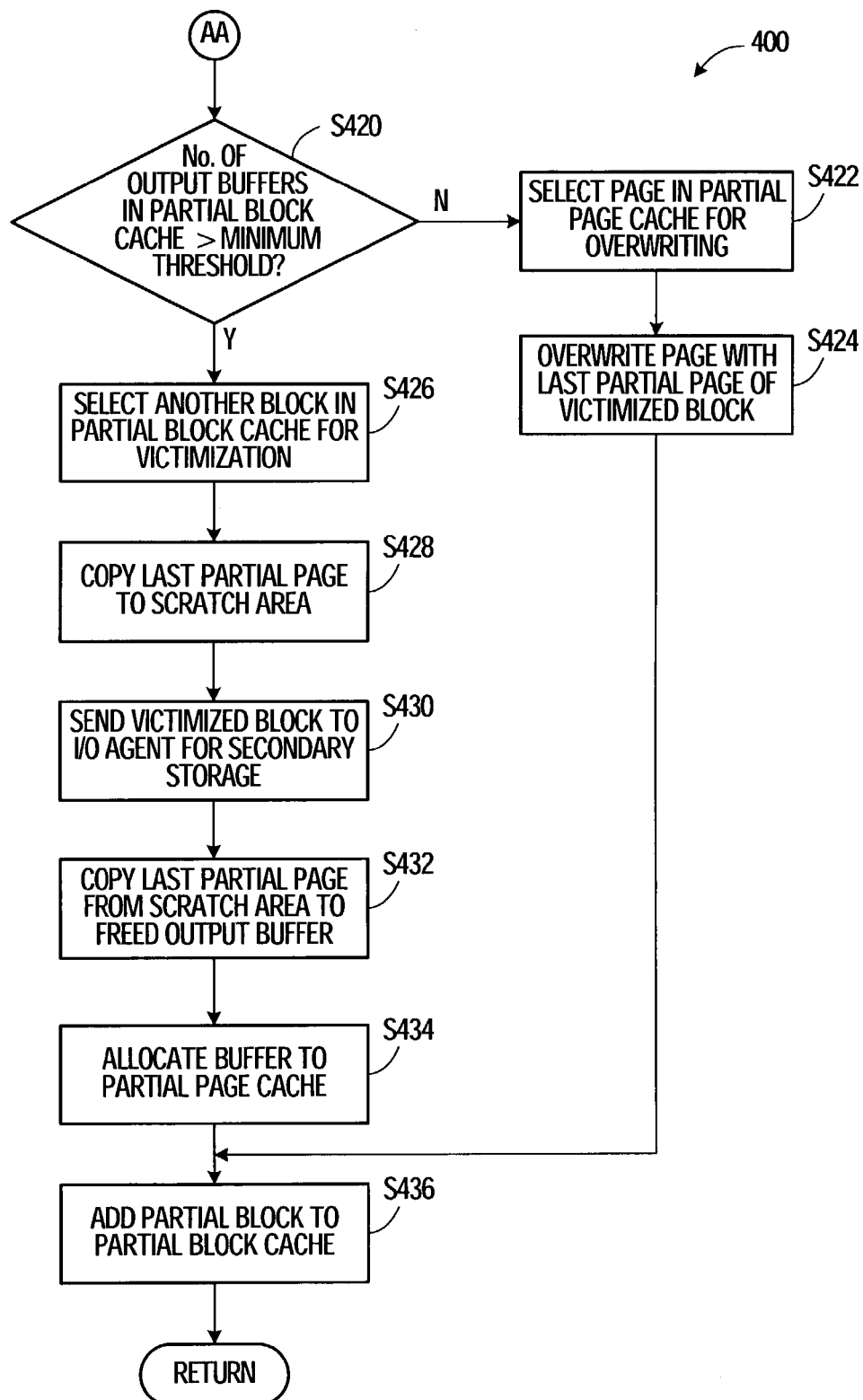

Operation of the present embodiment is illustrated in FIG. 3 (FIGS. 3A, 3B, 3C, 3D) and FIG. 4 (FIGS. 4A, 4B).

FIG. 3 (FIGS. 3A, 3B, 3C, 3D) illustrate operation 300 performed by a second-level clustering agent 32 for processing a sub-list from a first-level clustering agent 30. The same processing occurs for each sub-list received by the second-level clustering agent 32.

As shown in FIG. 3A, if the cell corresponding to the current sub-list has not previously been detected in the input stream (S302) or if it has been encountered but the last block that was processed for the cell was full and was written to disk (S308) (assuming that the tests of S304 and S306 are answered in the negative), a new output buffer is acquired from the transfer buffer pool 42 for assembly of a new block (S310) for the newly encountered logical cell. If no transfer buffers are presently available, the second-level clustering agent 32 waits until one becomes available (e.g. until an I/O agent 44 completes writing a buffer to secondary storage 16 and returns an "emptied" buffer).

Once a buffer is acquired, rows of input data are then written into the acquired buffer (S312) until either the buffer becomes full or the current sub-list is empty. If the buffer has become full (S314), it is sent to an I/O agent 44 for storage into secondary storage 16 (S316). Any I/O agent 44 may process the buffer (e.g. the buffer may be placed in a queue and processed by the first free I/O agent 44). If further rows exist in the sub-list (S318), the process is repeated (from S310 to S318). If no further rows exist in the sub-list (S318), an entry is created for the current (new) cell in the cell table 34 (S322), and processing completes.

If the block is only partially full when all of the current sub-list rows have been written to the buffer (S314), it is added to the partial block cache 38 (S320) as described in more detail in FIGS. 4A and 4B. Thereafter an entry is created for the current (new) cell in the cell table 34 (S322). In the new entry in cell table 34, a pointer is set to identify the buffer in the block cache corresponding to this cell. Information is also recorded regarding the location in the block at which rows should be added if data for the cell is encountered later in the input stream. This information comprises the page number of the last partial page in the block and the position of the last row in the last partial page. All other fields are set to NULL.

If, the cell has previously been detected in the input stream (S302) and the partial block cache 38 contains a block for the cell (S304) (as may be determined by consulting the cell table 34, e.g., by searching for the desired key in a cell table index that points to the proper location in the cell table 34), the rows of the current sub-list are written directly to the cached partial block until the block is filled or the sub-list is empty (S328 of FIG. 3B). If the block is filled (S330), it is sent to an I/O agent 44 (e.g. to the first free I/O agent 44) for storage in secondary storage 16 (S332).

If further rows exist in the sub-list (S334), another output buffer is acquired from the transfer buffer pool 42 (S336), waiting as necessary. It will be appreciated that a new output buffer is acquired because the filled buffer has been passed to an I/O agent 44 for the purpose of writing the full block to secondary storage 16 to maintain the same number of buffers in the partial block cache 38. The newly acquired buffer takes the place of the buffer that was just sent to an I/O agent 44 in the partial block cache 38. If no further rows exist in the sub-list (S334), the entry in cell table 34 corresponding with the current cell is updated with new last partial page information (S338) and processing of the sub-list completes. The process is then repeated (from S328 to S338).

If at the end of writing the sub-list a partially filled block is left in the output buffer, the partial block is left in the partial block cache 38, and the entry in cell table 34 corresponding with the current cell is updated with new last partial page information (S338).

If the current cell has previously been detected in the input stream (S302—FIG. 3A) and there is no block for the cell in the partial block cache 38 (S304) but its last partial page is found in the partial page cache 40 (S306), either a partial block for the current cell has previously been spilled to secondary storage 16 or a partial block is currently waiting for its I/O agent 44 to complete the work of spilling it to secondary storage 16. In this case, any available output buffer is obtained from the transfer buffer pool 42 (S340—

FIG. 3C). The last partial page is copied from the partial page cache 40 to the appropriate place within the acquired buffer, i.e., to the place at which the last partial page resided in the partial block that was spilled to secondary storage 16 (S342).

Thereafter, further rows of input data are written into the acquired buffer (S344), but rather than starting at the beginning of the buffer, rows are written starting at the first empty row of the last partial page. This location is determined by reading the page number of the last partial page and the last used row of the last partial page from the cell table 34. Rows are written from where the last partial page left off until the block is completed or the current sub-list is empty. It will be appreciated that "completed" in this context means "filled from the point at which writing is resumed" as opposed to "filled from the beginning". It will further be appreciated that this writing is a form of assessing whether sufficient input data exists to complete a block.

If the buffer is completed (S346), it is sent to an I/O agent 44 for storage into secondary storage 16. The previous partial block could still be in the queue, therefore, all CONTINUATION requests for the same block are sent to the same I/O agent 44. The buffer is sent to the I/O agent 44 with a CONTINUATION request (S348), indicating that the block is the continuation of a previous partial block already stored in secondary storage 16 and that the block's data (beginning with the last partial page that was in the partial page cache 40) is to be appended to the end of the data of the stored partial block (possibly overwriting the last partial page if the last partial page was stored in secondary storage 16 upon victimization) to form a full block.

If further rows exist in the sub-list (S350), another output buffer is acquired from the transfer buffer pool 42 (S352), waiting as necessary, and processing resumes at S344. It will be appreciated that, in this case, the "proper location" at which rows are written (S344) is at the beginning of a newly acquired output buffer. If no further rows exist in the sub-list (S350), the entry in cell table 34 corresponding with the current cell is updated with new last partial page information (S355) and processing of the sub-list completes.

If a partial block remains when the sub-list is exhausted, the partial block is added to the partial block cache 38 (S354). The processing 300 of S354 (which is equivalent to S320 of FIG. 3A) is described in more detail in FIGS. 4A and 4B. The cell table 34 is then updated, in this case with information regarding the added partial block (S355).

If the current cell has previously been encountered in the input stream (S302—FIG. 3A) but there is no partial block for the cell in the partial block cache 38 (S304), no last partial page for the cell in the partial page cache 40 (S306), and the last block for this cell was not full (S308), this indicates that a partial block for the current cell has previously been spilled to secondary storage 16 and that its last partial page has been victimized from the partial page cache 40 since the most recent encounter with data for this cell. When the partial block ends on a page boundary, the last page with data may be treated as a partial page even if it is a full page for simplicity of the algorithm.

In this case, an output buffer is obtained from the transfer buffer pool 42 (S356—FIG. 3D). The page number of the last partial page and the identity of the last used row of the last partial page are read from the entry in cell table 34 corresponding to the current cell. This information is used to write the rows of the current sub-list to the buffer starting immediately after the position of the most recently written row of this cell (S358). It will be appreciated that at least one row at the beginning of the block under assembly will be empty as a result. If the input data is sufficient to complete the block (S360), the block is sent to an I/O agent 44 with a MERGE request (S362), indicating that the corresponding partially filled block for the current cell presently in secondary storage 16 is to be read in by the I/O agent 44 and merged with the current partial block to create a proper block for writing back to secondary storage 16.

If further rows exist in the sub-list (S364), another output buffer is acquired from the transfer buffer pool 42 (S356), waiting as necessary. In this case, the "proper location" for the writing of rows of the sub-list cell (S358) is at the beginning of the acquired output buffer. If no further rows exist in the sub-list (S364), the entry in cell table 34 corresponding with the current cell is updated (S370) and processing of the sub-list completes.

If a partial block remains when the sub-list is exhausted, the partial block is added to the partial block cache 38 (S368). The processing of S368 (which is equivalent to S320 of FIG. 3A) is described in more detail in FIGS. 4A and 4B. The cell table 34 is then updated, in this case with information regarding the added partial block (S370).

FIG. 4 (FIGS. 4A, 4B) illustrate operation 400 by a second-level clustering agent 32 for writing a partial block to the partial block cache 38.

If the total number of output buffers 36 allocated to the partial block cache 38 and the partial page cache 40 is less than the maximum allowed (i.e. Y buffers) (S402), the partial block is simply added to the partial block cache 38 (S404) and the partial block writing operation 400 completes.

Otherwise, the total number of output buffers 36 used for both partial block cache 38 and partial page cache 40 is equal to the maximum number allowed (Y). In this case, an existing partial block should be victimized from the partial block cache 38 to allow the current partial block to be written thereto.

To achieve this, a partial block in the partial block cache 38 is initially selected for victimization (S410), using any suitable victimization algorithm (e.g. Least Recently Used). If it is determined (at S412) that space exists in the partial page cache 40 to store a partial page, the last partial page of the to-be-victimized block is copied into the partial page cache 40 (S414). The selected partial block is then sent to an I/O agent 44 for writing to secondary storage 16 (S416) to effect victimization (i.e. to be "spilled"). This frees space for an additional block in the partial block cache 38, allowing the new partially filled block to be added (S418). It will be appreciated that the selected partial bock is spilled directly to the secondary storage 16 versus a temporary work area., Consequently, the input data contains no more data for the cell corresponding to the block and no further I/O operations will need to be performed with respect to that partial block. Operation 400 is thus completed.

If sufficient space does not exist in the partial page cache 40 to contain the last partial page of the victimized block (S412), a check is performed (at S420, FIG. 4B) as to whether the number of output buffers 36 allocated to the partial block cache 38 is greater than the minimum threshold number (T) of output buffers 36.

If the number of output buffers allocated to the partial block cache 38 is found to be greater than the minimum threshold number of output buffers 36, then an output buffer 36 should be removed from the partial block cache 38 and reassigned to the partial page cache 40. To achieve this, another block of the partial block cache 38 is selected for victimization (S426) and the last partial page of the selected block is copied to a scratch area (S428). Thereafter, the selected block is sent to an I/O agent 44 for secondary storage. The last partial page is then copied from the scratch area to the freed output buffer (S432), and the output buffer is allocated to the partial page cache 40 (S434). The last partial page may be written to any available location within the output buffer 36 as long its location is stored in the cell table 34 for subsequent location of the last partial page. The new partially filled block is thereafter written to the partial block cache 38 (S436), thus completing operation 400.

If, on the other hand, the number of output buffers 36 allocated to the partial block cache 38 is found to be equal to the minimum threshold number of output buffers 36, a page of the partial page cache 40 is selected (e.g. by way of a Least Recently Used scheme) for overwriting (S422), and subsequently overwritten with the last partial page (S424). The new partially filled block is thereafter written to the partial block cache 38 (S436), thus completing operation 400.

It will be appreciated that when a partially filled block associated with a particular cell is sent to an I/O agent 44 to be written to secondary storage 16 in the present embodiment (e.g. S416 of FIG. 4A or S430 of FIG. 4B), and it is the first time that any partial blocks for that cell are being written to secondary storage 16, an I/O agent 44 is selected at random. However, when subsequent partial blocks are stored in secondary storage 16 for the same cell, the same I/O agent 44 is used as was initially used. This process avoids a potential data-overwriting situation, as follows: when two buffers, buffer 1 and buffer 2, are to be written to secondary storage 16 for the same cell, and buffer 2 is written to secondary storage 16 first despite the fact that buffer 1 is filled before buffer 2, as may occur if the I/O agent 44 assigned to buffer 1 was initially busy and the I/O agent 44 assigned to buffer 2 was free, the subsequent writing of buffer 1 by the first I/O agent 44 may overwrite buffer 2 data. The use of a single I/O agent 44 to address this problem may not be necessary for all embodiments, some of which may utilize database products having low-level protocols that guard against such eventualities.

Entries in cell table 34 are removed at the end of the clustering operation.

It will be appreciated that the relative speed of access of volatile memory 14 (where partial block cache 38 and partial page cache 40 are maintained) compared to secondary storage 16 is the source of the present embodiment's I/O efficiency. Of course, if a non-volatile memory medium were capable of being accessed at comparable speeds, it could be substituted for volatile memory 14.

In accordance with the described embodiment, when input data is well clustered, read/write efficiency becomes near-optimal because partial blocks rarely need to be read back from secondary storage 16 and will generally be written to secondary storage 16 only once. In this case, it is the first-level clustering agents 30 that help provide good performance since the first-level clustering agents 30 work concurrently to group rows belonging to the same cell.

When input data is not well clustered, maintenance of a partial page cache 40 tends to reduce the number of read operations of partial blocks from secondary storage 16, as might otherwise be required if assembly of a particular block occurs piecemeal during loading. Moreover, when the data is not well clustered and memory constraints are such that many more cells exist in the input stream than can be managed by the partial block cache 38 and partial page cache 40 (i.e., the partial block cache 38 and partial page cache 40 are not sufficiently large to handle cell data for the many different cells), performance may be improved by increasing the amount of memory available for clustering by the first level clustering agents 30. This is because memory is managed with finer granularity by the first-level clustering agents 30 than by the second-level clustering agent 32. That is, given the same amount of memory, the first-level clustering agents 30 are capable of clustering more rows than the second level clustering agent 32 because the smallest unit that is operated on by the first-level clustering agents 30 is a row, whereas the second-level clustering agent 32 operates on partial pages (in the partial page cache 40) and on partial blocks (in the partial block cache 38), which can be wasteful of memory.

As will be appreciated by those skilled in the art, modifications to the above-described embodiment can be made without departing from the essence of the invention. For example, this solution may be applied not just to loading MDC tables, but to any data-clustering problem where data is to be clustered along one or more dimensions specified by a clustering key.

Alternative embodiments may have fewer than M I/O agents 44. As a general rule, the higher the number of I/O agents 44, the greater the efficiency due to parallelism (at least for numbers of I/O agents 44 up to the number of devices of secondary storage 16 capable of being written to in parallel).

In another alternative, the number of buffers in the partial block cache 38, partial page cache 40, and in transfer buffer pool 42, which is fixed for the duration of processing at T, Y-T and P-Y buffers respectively in the steady-state condition of the described embodiment, could be allowed to fluctuate such that when a buffer becomes free in the partial page cache 40 it is reassigned back to the partial block cache 38.

In addition, it is not necessary for the partial page cache 40 to be made up of block-sized buffers. Other buffer sizes could be used in the partial page cache 40 (although the partial page cache 40 should be a multiple of a page in size). Of course, maintaining a buffer size of one block in the partial page cache 40 may simplify the reassignment of blocks between the partial block cache 38 to the partial page cache 40 because the buffers in both caches are the same size.

On a single processor computing device, parallel processing of input data portions as performed by the first-level clustering agents 30 of the above-described embodiment would obviously not be possible, thus any performance improvements obtaining therefrom would not be provided. Execution of the algorithm of FIGS. 3A–3D and 4A–4B directly on an input data stream would also likely be of reduced efficiency as compared to the above-described multi-processor case, since more swapping of data between the partial block cache 38 and partial page cache 40 and secondary storage 16 is likely to occur.

It is to be understood that the specific embodiments of the invention that have been described are merely illustrative of certain application of the principle of the present invention. Numerous modifications may be made to the adaptive parallel data clustering when loading a data structure containing data clustered along one or more dimensions invention described herein without departing from the spirit and scope of the present invention.

The invention claimed is:

1. A method of loading an input data stream into a data structure containing data that is clustered along one or more dimensions, comprising:

storing, in a partial block cache, a plurality of partial blocks that are assembled from the input data stream;

wherein each partial block is associated with a distinct logical cell; and storing, in a partial page cache, a plurality of last partial pages of the partial blocks that have been victimized from the partial block cache.

2. The method of claim 1, further comprising comparing a cell encountered in the data stream, to a sub-list from a first-level clustering agent, in order to determine whether the cell has been previously detected in the input data stream.

3. The method of claim 2, further comprising writing a cell that has not been previously encountered to an output buffer.

4. The method of claim 3, further comprising sending completely filled blocks to an I/O agent for secondary storage.

5. The method of claim 3, further comprising adding partially filled blocks to the partial block cache.

6. The method of claim 3, further comprising creating an entry, in a cell table, for the cell encountered in the data stream.

7. The method of claim 3, further comprising finding a block in the partial block cache that contains blocks for the cell that has been previously encountered.

8. The method of claim 7, further comprising writing rows of the sub-list from the first clustering agent to the output buffer in the partial block cache until the sub-list is empty.

9. The method of claim 2, further comprising finding a last partial page in the partial page cache.

10. The method of claim 9, further comprising copying the last partial page from the partial page cache into the output buffer.

11. The method of claim 10, further comprising sending completely filled blocks to the I/O agent with a continuation request.

12. The method of claim 5, further comprising adding partially filled blocks to the partial block cache if the partial block cache and partial page cache contain less than a predetermined number of buffers.

13. The method of claim 5, further comprising selecting a block in the partial block cache for victimization, if the partial block cache and partial page cache contain a maximum number of buffers.

14. The method of claim 13, further comprising copying a last partial page of the selected blocks into the partial page cache, if space exists in the partial page cache for a partial page.

15. The method of claim 14, further comprising sending a victimized block to the I/O agent for secondary storage.

16. A computer program product having instruction codes for loading an input data stream into a data structure containing data that is clustered along one or more dimensions, comprising:

a first set of instruction codes for storing, in a partial block cache, a plurality of partial blocks that are assembled from the input data stream;

wherein each partial block is associated with a distinct logical cell; and a second set of instruction codes for storing, in a partial page cache, a plurality of last partial pages of the partial blocks that have been victimized from the partial block cache.

17. The computer program product of claim 16, further comprising a third set of instruction codes for comparing a cell encountered in the data stream, to a sub-list from a first-level clustering agent, in order to determine whether the cell has been previously detected in the input data stream.

18. The computer program product of claim 17, further comprising a fourth set of instruction codes for writing a cell that has not been previously encountered to an output buffer.

19. The computer program product of claim 18, further comprising a fifth set of instruction codes for sending completely filled blocks to an I/O agent for secondary storage.

20. The computer program product of claim 19, further comprising a sixth set of instruction codes for adding partially filled blocks to the partial block cache.

21. The computer program product of claim 20, further comprising a seventh set of instruction codes for creating an entry, in a cell table, for the cell encountered in the data stream.

22. The computer program product of claim 21, further comprising an eight set of instruction codes for finding a block in the partial block cache that contains blocks for the cell that has been previously encountered.

23. The computer program product of claim 22, wherein the fourth set of instruction codes writes rows of the sub-list from the first clustering agent to the output buffer in the partial block cache until the sub-list is empty.

24. The computer program product of claim 23, wherein the eight set of instruction codes further finds a last partial page in the partial page cache.

25. The computer program product of claim 24, further comprising a ninth set of instruction codes for copying the last partial page from the partial page cache into the output buffer.

26. The computer program product of claim 25, wherein the fifth set of instruction codes further sends completely filled blocks to the I/O agent with a continuation request.

27. The computer program product of claim 26, wherein the sixth set of instruction codes further adds partially filled blocks to the partial block cache if the partial block cache and partial page cache contain less than a predetermined number of buffers.

28. The computer program product of claim 27, further comprising a tenth set of instruction codes for selecting a block in the partial block cache for victimization, if the partial block cache and partial page cache contain a maximum number of buffers.

29. The computer program product of claim 28, wherein the ninth set of instruction codes further copies a last partial page of the selected blocks into the partial page cache, if space exists in the partial page cache for a partial page.

30. The computer program product of claim 29, wherein the fifth set of instruction codes further sends a victimized block to the I/O agent for secondary storage.

31. A system for loading an input data stream into a data structure containing data that is clustered along one or more dimensions, comprising:

means for storing, in a partial block cache, a plurality of partial blocks that are assembled from the input data stream;

wherein each partial block is associated with a distinct logical cell; and means for storing, in a partial page cache, a plurality of last partial pages of the partial blocks that have been victimized from the partial block cache.

32. The system of claim 31, further comprising means for comparing a cell encountered in the data stream, to a sub-list from a first-level clustering agent, in order to determine whether the cell has been previously detected in the input data stream.

33. The system of claim 32, further comprising means for writing a cell that has not been previously encountered to an output buffer.

34. The system of claim 33, further comprising means for sending completely filled blocks to an I/O agent for secondary storage.

35. The system of claim 34, further comprising means for adding partially filled blocks to the partial block cache.

36. The system of claim 35, further comprising means for creating an entry, in a cell table, for the cell encountered in the data stream.

37. A method of loading an input data stream into a data structure containing data that is clustered along one or more dimensions, comprising:

storing, in a partial block cache, a plurality of partial blocks that are assembled from the input data stream;

wherein each partial block is associated with a distinct logical cell; and storing, in a partial subblock cache, a plurality of last partial subblocks of the partial blocks that have been victimized from the partial block cache.

38. The method of claim 37, further comprising comparing a cell encountered in the data stream, to a sub-list from a first-level clustering agent, in order to determine whether the cell has been previously detected in the input data stream.

39. The method of claim 38, further comprising writing a cell that has not been previously encountered to an output buffer.

40. The method of claim 39, further comprising sending completely filled blocks to an I/O agent for secondary storage.

41. The method of claim 39, further comprising adding partially filled blocks to the partial block cache.

42. A computer program product having instruction codes for loading an input data stream into a data structure containing data that is clustered along one or more dimensions, comprising:

a first set of instruction codes for storing, in a partial block cache, a plurality of partial blocks that are assembled from the input data stream;

wherein each partial block is associated with a distinct logical cell; and a second set of instruction codes for storing, in a partial subblock cache, a plurality of last partial subblocks of the partial blocks that have been victimized from the partial block cache.

43. The computer program product of claim 42, further comprising a third set of instruction codes for comparing a cell encountered in the data stream, to a sub-list from a first-level clustering agent, in order to determine whether the cell has been previously detected in the input data stream.

44. The computer program product of claim 43, further comprising a fourth set of instruction codes for writing a cell that has not been previously encountered to an output buffer.

45. The computer program product of claim 44, further comprising a fifth set of instruction codes for sending completely filled blocks to an I/O agent for secondary storage.

46. The computer program product of claim 45, further comprising a sixth set of instruction codes for adding partially filled blocks to the partial block cache.

\* \* \* \* \*